(12) United States Patent
Barratt et al.

(10) Patent No.: US 7,702,298 B2
(45) Date of Patent: *Apr. 20, 2010

(54) METHOD AND APPARATUS TO PROVIDE MULTIPLE-MODE SPATIAL PROCESSING IN A RADIO RECEIVER

(75) Inventors: Craig H. Barratt, Redwood City, CA (US); Athanasios A. Kasapi, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/853,992

(22) Filed: Sep. 12, 2007

(65) Prior Publication Data

US 2008/0004078 A1    Jan. 3, 2008

Related U.S. Application Data

(63) Continuation of application No. 10/265,896, filed on Oct. 7, 2002, now Pat. No. 7,277,679, which is a continuation of application No. 09/967,863, filed on Sep. 28, 2001, now Pat. No. 6,965,788.

(60) Provisional application No. 60/386,183, filed on Dec. 31, 2001, provisional application No. 60/386,184, filed on Dec. 31, 2001.

(51) Int. Cl.
*B61H 1/00*    (2006.01)

(52) U.S. Cl. ..................... 455/101; 455/132; 455/138; 375/347

(58) Field of Classification Search .................. 455/101
See application file for complete search history.

(56) References Cited

U.S. PATENT DOCUMENTS

| 5,978,683 | A | 11/1999 | Kunisawa |
|---|---|---|---|
| 6,167,039 | A | 12/2000 | Karlsson et al. |
| 6,473,601 | B1 | 10/2002 | Oda |
| 6,600,907 | B1 | 7/2003 | Taguchi |
| 6,678,253 | B1 | 1/2004 | Heath, Jr. et al. |
| 6,760,882 | B1 | 7/2004 | Catreux et al. |
| 7,277,679 | B1 * | 10/2007 | Barratt et al. ............... 455/101 |
| 2002/0154705 | A1 | 10/2002 | Walton et al. |

* cited by examiner

*Primary Examiner*—Nay A Maung
*Assistant Examiner*—Angelica M Perez
(74) *Attorney, Agent, or Firm*—Blakely, Sokoloff, Taylor & Zafman LLP

(57) ABSTRACT

Methods and apparatuses, including computer program products, for spatial processing in a radio receiver. One embodiment is a radio receiver for operation in a wireless communication system. The radio receiver may include a receive processing unit to process signals received by an antenna array by applying a selected spatial processing mode of a plurality of spatial processing modes. The modes include one or more modes of one or more spatial processing methods. The receiver also includes a selector to select the spatial processing mode from the plurality of spatial processing modes. The selecting includes selecting the spatial processing method in the case that the set of spatial processing modes are of more than one spatial processing method.

18 Claims, 9 Drawing Sheets

METHOD AND APPARATUS TO PROVIDE MULTIPLE-MODE SPATIAL PROCESSING IN A RADIO RECEIVER

RELATIONSHIP TO OTHER APPLICATIONS

The present application is a continuation of U.S. patent application Ser. No. 10/265,896 filed Oct. 7, 2002 now U.S. Pat. No. 7,277,679, entitled "METHOD AND APPARATUS TO PROVIDE MULTIPLE-MODE SPATIAL PROCESSING TO A TERMINAL UNIT" which claimed priority to U.S. provisional patent application Ser. No. 60/386,183 filed 31 Dec. 2001 to inventors Barratt et al., titled METHOD AND APPARATUS FOR PROVIDING A MULTIPLE-MODE SPATIAL PROCESSING TERMINAL UNIT, U.S. provisional patent application Ser. No. 60/386,184 filed 31 Dec. 2001 to inventors Barratt et al., titled METHOD AND APPARATUS FOR PROVIDING A MULTIPLE-MODE TERMINAL UNIT, and U.S. patent application Ser. No. 09/967,863 filed 28 Sep. 2001 now U.S. Pat. No. 6,965,788 to inventors Barratt et al., titled A METHOD AND APPARATUS FOR PROVIDING SPATIAL PROCESSING IN A REMOTE UNIT.

BACKGROUND

1. Field

The present invention relates generally to a wireless communication system, and in particular to a radio receiver that includes a plurality of spatial processing modes. Such a receiver may be part of a transceiver used, for example, in a remote terminal unit of a wireless communication system.

2. Background

Spatial processing using several antennas may be used in virtually any wireless communication receiver, transmitter or transceiver that receives or transmits radio frequency (RF) signals. In the case of a receiver or the receive portion of a transceiver, spatial processing allows processing of the signals received at the antennas. Such receive spatial processing provides for performance improvements over conventional devices that communicate using a single antenna. These improvements include, but are not limited to, improvements in the signal-to-noise ratio (SNR) and the signal-to-interference-plus-noise ratio (SINR) of the received signals, and improvements in the directionality with which signals can be received from a selected device.

Though base stations have often been equipped with, and have benefited from, spatial processing capability, until now, there have been a number of obstacles to implementing spatial processing in remote terminals. For instance, there is an incentive to keep the power consumption of remote terminals low. There also is an incentive to keep the cost of remote terminal units low. Unfortunately, spatial processing typically requires several electronic signal paths, thus relatively high power consumption, and also some computational power. Therefore, the significant increase in cost and power consumption associated with implementing spatial processing in a remote terminal may be prohibitive of such implementation.

Moreover, of the various spatial processing methods known for receiving, it may be difficult to determine which, if any, are particularly suited to a particular remote terminal application or situation. Various spatial processing methods may require different amounts of computation and different amounts of power consumption. Furthermore, some may be applicable to only particular types of signals. Furthermore, different strategies for the spatial processing may be designed to improve or even optimize different factors, and it may be impossible to simultaneously satisfy all desirable properties of the processing.

Therefore, though it would be desirable to benefit from the general performance gains that spatial processing would provide if employed in a remote terminal unit, it would also be desirable to overcome the above-mentioned drawbacks.

SUMMARY

The present invention provides methods and apparatuses, including computer program products, for spatial processing in a remote terminal unit. In one embodiment of the invention, a remote terminal unit includes a plurality of antennas and a spatial processor. The remote terminal unit provides a set of spatial processing modes of one or more spatial processing methods to use to process signals received on the antennas. In one embodiment, the terminal unit includes a selector for selecting from the provided spatial processing modes.

In one embodiment, the set of spatial processing modes includes at least one of: one or more modes of a delay and add processing method; one or more modes of a switched antenna diversity spatial processing method; one or more modes of an adaptive smart antenna spatial processing method using a maximum ratio combining strategy determining method; one or more modes of an adaptive smart antenna spatial processing method using a known signal property strategy determining method; one or more modes of an adaptive smart antenna spatial processing method using a known training signal strategy determining method; and one or more modes of a switched beam smart antenna spatial processing method.

One embodiment includes manually selecting the spatial processing mode. Selecting the mode includes selecting the method in the case that the remote terminal includes more than one method. Another embodiment includes the spatial processing mode being remotely selected, e.g., from a base station. Yet another embodiment includes automatically selecting the spatial processing mode at the remote terminal according to one or more selection criteria.

Criteria for selecting one spatial processing mode over another or over no spatial processing may be based on one or more factors. In accordance with one embodiment of the invention, such factors include, but not are limited to the following: the quality of signals received from a selected transmitter or transmitted to a selected receiver; the power delivered to a selected receiver; the relative importance between a selected remote receiver; transmitter or transceiver, and one or more interfering receivers, transmitters or transceivers; the relative need for mitigation or nulling of the signals received from or transmitted to an interferer; the input signal-to-noise (SNR) ratio; the carrier-to-interference ratio (CIR); the bit error rate (BER); and the spatial correlation between a transmitting remote device and an interfering remote device.

In one embodiment, some of the spatial processing modes differ in power consumption. In another embodiment, some of the spatial processing modes and/or methods differ in the computational power required to operate the spatial processing mode. Furthermore, the spatial processing method(s) and/or mode(s) thereof may differ in relative performance/suit-

DETAILED DESCRIPTION

The present invention provides a flexible spatial processing mechanism in a user device or remote terminal unit. In particular, the present invention provides multiple spatial processing modes of one or more spatial processing methods in a remote terminal unit. The invention further provides a flexible approach for selecting between the various spatial processing modes and/or methods. As such, the invention allows a remote terminal unit to utilize a spatial processing method/mode that is suited for a particular situation, and thereby improve reception quality, power efficiency, and/or other factors.

A remote terminal that can include spatial processing may be a cellular or peer-to-peer type handset, a telephone unit, a data and/or voice modem, computer, or a network appliance such as a Personal Digital Assistant (PDA), gaming device, or some other remote device that includes a radio transceiver. Furthermore, a remote terminal may be mobile or fixed. Furthermore, a remote terminal may be for voice communication, for data communication, or for both. It is desired to add spatial receive processing to such a remote terminal.

In one embodiment, the invention is incorporated in a receiver, e.g., part of a transceiver for inclusion in a remote terminal. In this embodiment, the remote terminal, or the receiver therein provides a plurality of spatial processing modes so that one mode can be selected over another. The selection may be in order to keep down the power consumption or the computational complexity of the spatial processing, or both while maintaining a sufficient quality of reception. One embodiment includes a mechanism for selecting a spatial processing mode from the plurality of modes. One embodiment further provides a method and apparatus for determining which mode to choose in different situations.

Figure 1A:
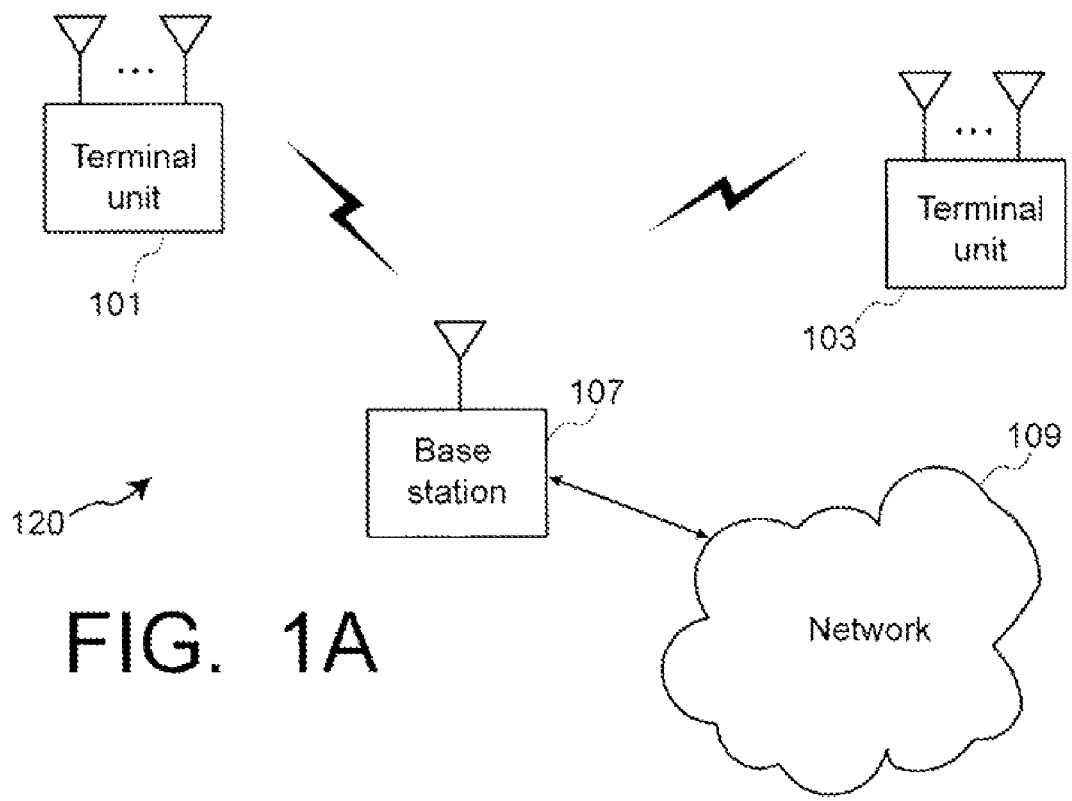
FIGS. 1A and 1B each shows a wireless system that includes one or more remote terminal units, in accordance with one embodiment of the invention.

FIG. 1A shows a remote terminal unit 101 as part of a wireless communication system 120 that includes a base station 107 in communication with a network 109. The network may be the cellular network that in turn is connected to the public switched telephone network, or the Internet or any other wireless communication network. Another remote terminal unit is shown as unit 103. The base station may, but does not necessarily, include an array of antennas and spatial processing.

Terminal unit 101 includes an embodiment of the present invention and in the description herein is a handset for a cellular communication system. The wireless system 120 in one embodiment is a digital cellular system that uses TDMA in a frequency channel to provide multiple communication channels in one frequency channel. In one embodiment, the system uses time domain duplexing (TDD), that is, the communication from a handset to the base station (called the uplink direction) is in the same frequency channel but on a different timeslot as communication from the base station (called the downlink direction). One example of such a system is the Personal Handiphone System (PHS) in widespread use in Japan and elsewhere. The invention, however, is not restricted to PHS, or TDD, or to TDMA systems, or even to common cellular systems. Another embodiment uses CDMA (IS-95). Yet another embodiment uses GSM.

Figure 1B:
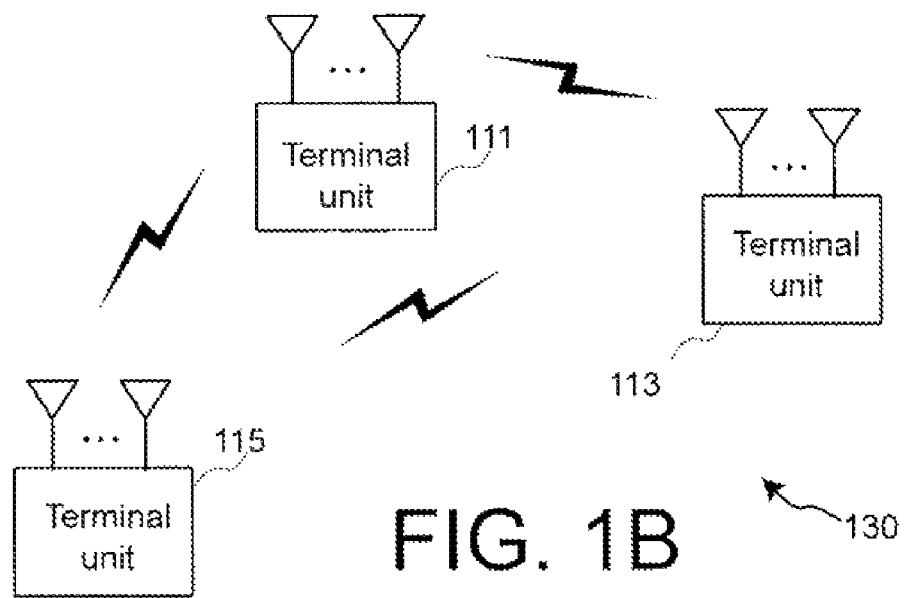

FIG. 1B shows a remote terminal unit 111 as part of a wireless communication system 130 that is in an ad-hoc configuration that does not necessarily include a base station. Terminal unit 111 includes an embodiment of the present invention and may be, for example, a network card in a laptop computer for use in an ad-hoc wireless local area network. Other terminal units such as terminal units 113 and 115 communicate directly with terminal unit 111 as well as with each other. In the configuration of FIG. 1A, on the other hand, all communication occurs via the base station.

Figure 2A:
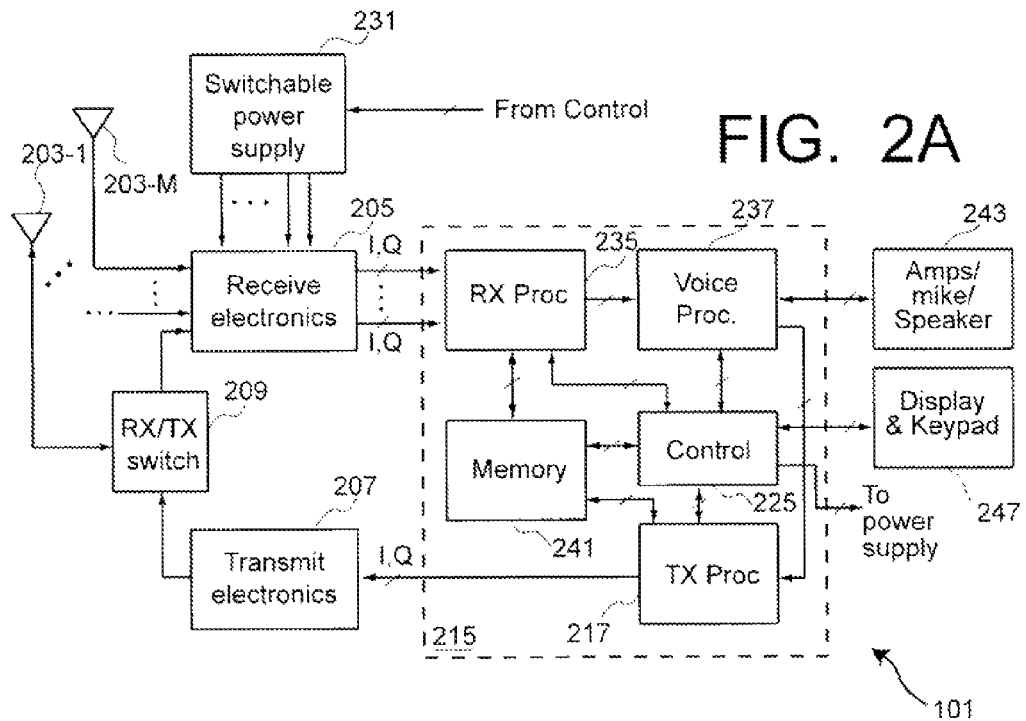
FIG. 2A shows a block diagram of one embodiment of a remote terminal unit suitable for use in a cellular voice communication system such as a common cellular telephone system.

FIG. 2A is a block diagram illustrating the architecture of one embodiment of the remote terminal unit 101. The remote terminal unit 101 includes an array of antennas, in general M antennas with reference numerals 203-1, . . . , 203-M. A signal transmitted to the remote terminal is generally received at each antenna of the antenna array resulting in diversity with respect to the set of signals received at the antennas. In one embodiment, the first antenna, shown as antenna 203-1 is used for both transmit and receive, and is coupled to a duplexer 209 that switches the antenna between transmit and receive states. In the TDD embodiment, the duplexer 209 is a time switch that simply selects between a receive timeslot and a transmit timeslot that corresponds to the receive timeslot. The output of duplexer 209 is coupled to one of the inputs of a multi-channel receive electronics unit 205. The other one or more antennas are coupled to the other inputs of receive electronics unit 205. In one embodiment, receive electronics unit 205 includes a receive signal path for each of the signals from each of the antennas. A transmit electronics unit 207 produces a signal for transmission that is coupled to an input terminal of duplexer 209 so that the signal for transmission is coupled to the antenna 203-1 when the duplexer is in transmit state.

For transmission, normal traffic signals are obtained from a telephony interface unit 243 that typically in a handset includes a microphone, audio output amplifier, and a loudspeaker. The signals from telephone unit 243 are fed to a transmit signal processing unit 217 via a vocoder processor 237. In-phase and quadrature (I, Q) samples for transmission are formed in the transmit processor 217 which is connected to a memory 241 shared with another processing unit, receive processor 235 used for signal reception. The transmit signal processing unit 217 is programmed to carry out the modulation, and other encoding functions to generate the I,Q signals for transmission. These signals are fed to transmit electronics unit 207.

Signals are received at the antennas and input into the receive electronics unit 205 that in one embodiment includes for each antenna signal a superheterodyne radio receiver and a set of analog to digital converters. The antennas provide diversity. Each receive path in the receive electronics unit 205 converts one of the antenna signals into digital in-phase and quadrature (I,Q) baseband signal samples for further processing. The I,Q baseband digital signals from the receive paths of the receive electronics unit are then processed by the receive signal processing unit 235 programmed to carry out the receive baseband processing. Such processing in one embodiment includes baseband pre-processing, baseband filtering, removing any frequency offset, removing any timing offset, and correcting for any I/Q mismatch in the received signals. In some implementations, baseband equalization may also be included in the pre-processing. How to carry out such pre-processing would be clear to those skilled in the art and is not the main concern of the invention. The receive processor 235 further includes a spatial processor to estimate the signal that was transmitted to the terminal unit 101 and demodulation of the signal. The demodulated signal samples are input to the voice processor 237 to produce voice signals for the telephony interface unit 243.

The memory 241 stores signals, processing methods and modes, and data, such as used, for example, in implementing one or more aspects of the invention.

Terminal unit 101 further includes a controller 225 that controls the function of the unit, including selecting the spatial processing mode. A user interface 247 that includes a keypad and a display keypad is coupled to the controller 225. Note that in some embodiments, the microphone and speaker also are part of the user interface, e.g., for voice commands and voice response, and thus, in general, the term "user interface" includes these elements.

One embodiment of terminal unit 101 further includes a switchable power supply 231 to selectively provide power to the different receive paths in the receive electronics unit 105 under control of the controller 225. One or more of the receive paths from corresponding antennas may be operated at a low-power mode for some of the spatial processing modes, while the other receive paths operate at a second power mode that consumes more power than the low-power mode. For example, in one embodiment, a receive path "operating" at the low-power mode means the receive path being switched off such that for some of the spatial processing modes, fewer receive paths are used. In some embodiments, only one receive path is used for one or more of the spatial processing modes. The switchable power supply provides for turning power between a first operating mode, e.g., on, and a second operating mode, e.g., off. One aspect of the invention uses this, for example, to turn off all receive paths but from the one antenna 203-1 when conditions warrant not using spatial processing, e.g., when the received signal strength is high. This saves power, which is important for example for a battery operated handset terminal unit. Those power-providing paths that are not controllably switched on or off are not shown in the drawing. Also, unnecessary details for understanding the invention are omitted. Another aspect of the invention includes using the switchable power supply to switch all the receive paths to a low-power operating mode when the signal quality is or is expected to be relatively high to save power. In one embodiment, power supply provides a lower bias to those circuits in the receive path that are to operate in a low-power operating mode.

Receive processor 235, memory 241, control unit 225, and transmit processor 217 together make up a baseband processor 215 for the terminal unit. The baseband processor 215 in one embodiment includes one or more microcontrollers and one or more DSP devices.

Figure 2B:
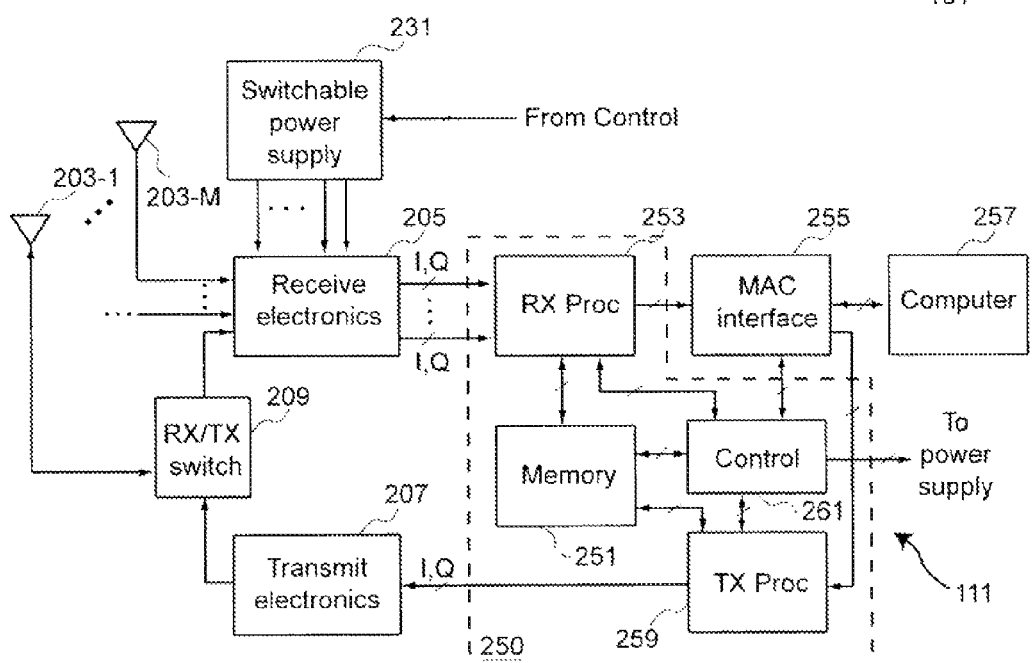
FIG. 2B shows a block diagram of an embodiment of a remote terminal unit suitable for use in a wireless data network.

FIG. 2B shows an alternate embodiment of a remote terminal unit such as terminal unit 111 of FIG. 1B for use in a wireless local area network. While the same reference numerals are used in FIGS. 2A and 2B for the antennas, the duplexer, the receive electronics and the transmit electronics, those in the art would understand that these components may be different in the sense that different frequencies, transmit powers, and RF architectures may be used, and that the processing may be slightly different. For example, one receive unit embodiment does not generate digital I,Q signals but rather a set of digital single sideband signal from which I and Q samples may be determined in the receive signal processor.

The terminal unit 111 of FIG. 2B includes in addition to the antennas, duplexer, receive electronics, switchable power supply, and transmit electronics, a memory 251 for storing signals, processing methods, and data, such as used, for example, in implementing one or more aspects of the invention. The digital baseband signals from the receive electronics unit 205 are processed by one or more signal processors 253 and fed to a media access control (MAC) interface 255, while signals from the MAC interface 255 are fed to a transmit processor to generate the digital baseband samples for transmission via transmit electronics unit 207. Units 253, 251, 259, 205, 207, 209, and 203-1, . . . , 203-M provide the functions of the physical layer (PHY) in a multi-layer protocol. The MAC unit provides the MAC functions and is coupled to a computer 257. The higher protocol layer functions in one embodiment are implemented in software running in computer 257.

Figure 2C:
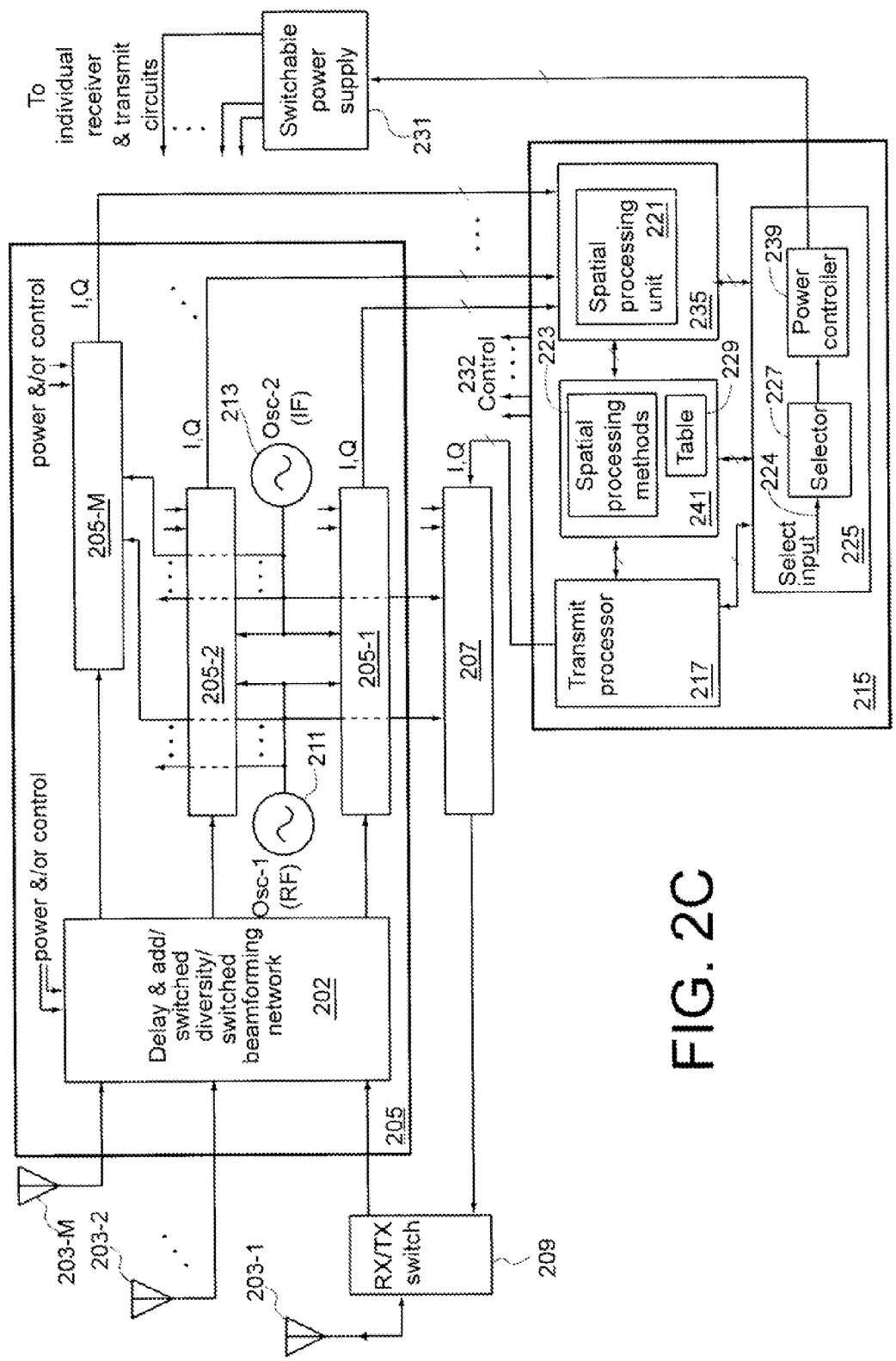
FIG. 2C shows the signal path of one embodiment of a remote terminal unit that includes multiple spatial processing modes.

FIG. 2C shows a functional block diagram one version of terminal unit 101 that includes the antenna array, the transmit electronics unit 207, a receive electronics unit 205 that includes receive paths 205-1, 205-2, . . . , 205-M, a baseband processor 215, a power supply 231 that in one embodiment includes a small rechargeable battery, and a duplexer 209. The receive electronics unit in some embodiments includes a network 202 that in some provides, depending on the embodiment, one or more of switched antenna diversity add and delay processing, and adaptive switched beam processing. The receive paths 205-1 . . . 205-M share a local IF oscillator 213 and a local RF oscillator 211. The same local oscillators also provide local oscillator signals for transmit electronics unit 207.

The baseband processor 215 includes the transmit processing unit 217 that produces signals to be forwarded to transmit electronics unit 207 for transmission out of antenna 203-1 with the duplexer 209 in the transmit position.

Baseband processor 215 also includes the receive processor 235 that includes a spatial processing unit 221 that processes signals received through antennas 203-1, . . . , 203-M using one of a set of one or more spatial processing methods 223 and modes thereof. In one embodiment, the set of spatial processing methods and the modes therefore are stored as method store 223 in the memory 241. In one form, the methods are stored as sets of code segments that instruct one or more of the processors of baseband processor 225 to implement the spatial processing method.

Generally, each spatial processing method takes advantage of the diversity that exists between two or more signals from two or more antennas of the antenna array. Diversity can be provided by one or more mechanisms such as using physical separated antennas, using antennas of different shapes, using different materials for the antennas, using directional antennas that point to different directions, and using antenna that provide polarization diversity. Other forms of diversity also may be used. The same processing method may have different modes, for example, different frequencies of determining the strategy for the method, or different quality of reception provided by the different receive paths in the receive electronics unit, or a different number of receive paths active.

The baseband processor 215 also includes the controller 225. The controller includes a selector 227. The selector 227 selects the spatial processing mode—including the spatial processing method—for processing the signals received by remote terminal unit 101. In one embodiment, the selector 227 is responsive to a select input 224. The operation of the selector and which and how spatial processing modes are selected is discussed in more detail below.

The controller in baseband processor 215 further includes a power controller 239 that provides signals to the switchable power supply 231 to switch one or more of the receive paths 205-1, ..., 205-M between a first operating mode, e.g., full power, and a second operating mode, e.g., low-power, or—in another embodiment—off, based on input provided by the selector 227. In embodiments in which the second operating mode is off, the switchable power supply provides for enabling or disabling one or more of the receive paths 205-1, ..., 205-M based on input provided by the selector 227. Alternatively, other techniques for enabling and disabling respective signal paths are used, including but not limited to logic for enabling and disabling power in a respective path and/or having a spatial processor not execute spatial processing methods.

In one embodiment, the power controller 239 and switchable power supply 231 in combination provide differing operating modes for some or all of the receive paths 205-1, ..., 205-M by providing different bias levels to the receive paths. The different bias levels provide for different amounts of power consumption for the receive paths. Lower power consumption in general provides a lower level of performance.

In some embodiments the controller 225 further produces a set of control signals 232 that are accepted by one or more of receive paths 205-1, ..., 205-M and that control the operation under one or more of the spatial processing modes.

In some embodiments the spatial processing unit 221 includes a circuit 220 to measure the signal quality according to a measure of the quality f reception. This measure is used by some of the spatial processing methods to determine the processing strategy. In one embodiment, the circuit 220 is implemented as a set of programming instructions for one or more of the processors of baseband processor 225.

As described in more detail below, some embodiments are capable of switched antenna diversity, others of switched beam spatial processing, and others of delay and add processing, and some of more than one of these methods under control of the controller 225. Some such embodiments include a network 202 that in one embodiment provides switched antenna diversity, in another embodiment delay and add processing, and in yet another embodiment adaptive switched beam spatial processing. Some embodiments include more than one of switched antenna diversity, delay and add processing, and adaptive switched beam processing. The network 202 is controlled by the controller 225 and is enabled for one or more of the set of spatial processing modes, e.g., by providing power control signals from the switchable supply 231 under control of the power controller 239.

Note that FIG. 2C includes components that may not be in all versions of terminal unit 101.

Figure 2D:
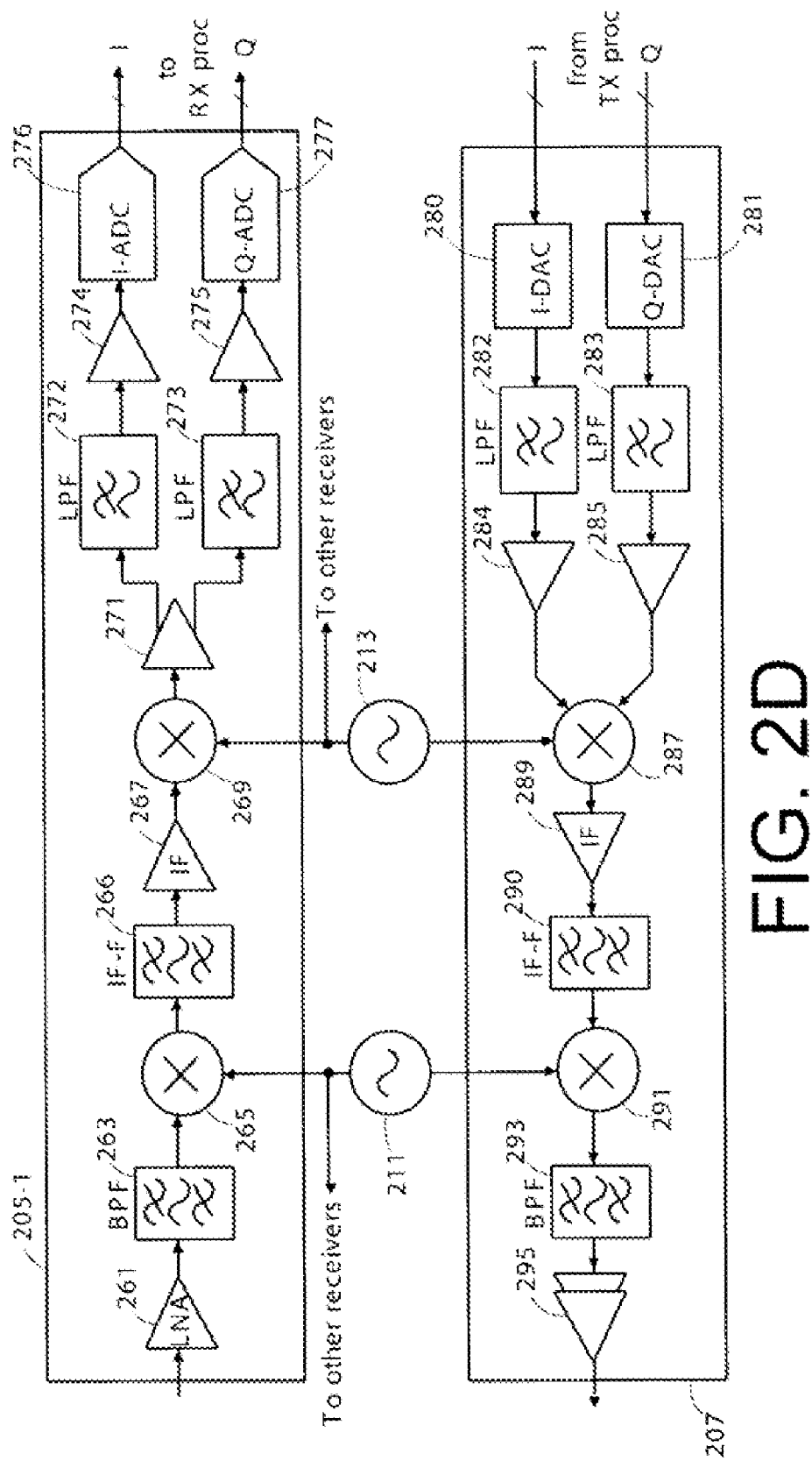
FIG. 2D shows in simplified form the architecture of one of the signal receivers and of the signal transmitter of a remote terminal such as shown in FIG. 2C.

FIG. 2D shows one embodiment of the transmit electronics unit 207 and the first receive path 205-1. A signal for transmission, in the form of I,Q samples of a modulated and coded baseband signal, is produced in the transmit processor 217. Each of the I and Q set of samples is converted to an analog signal by a digital-to-analog-converter (ADC) 280 and 281, respectively, passed through a low pass filter (LPF) 282 and 283 respectively, and a bandpass amplifier 284 and 285, respectively. The resulting I and Q signals are upconverted to an intermediate frequency using a mixer 287 that uses a signal from the local baseband oscillator 213. The intermediate frequency (IF) signal is amplified (IF amplifier 289) and filtered (IF-filter 290). IF filter 290 is a high quality bandpass filter that in one embodiment is implemented by a surface acoustic wave (SAW) device. The filtered and amplifier IF signal is then upconverted to the radio frequency by a mixer 291 that uses a signal from the local RF oscillator 211. The RF signal is filtered by a bandpass filter (BPF) 293 and fed to an RF power amplifier 295 to produce the signal for transmission. This signal coupled to and transmitted by the first antenna 203-1 via the duplexer when the duplexer 209 is in the transmit position.

For receiving, the signal from the antenna 203-1 or from the network 202, in those embodiments that include network 202 and when the network 202 is enabled is fed to a low-noise amplifier (LNA) 261 via the duplexer 209 when in the receive position. The amplifier RF signal is bandpass filtered by a BPF 263 and downconverted to the receive IF frequency by a mixer 265 that uses a signal from the local IF oscillator 211. The IF signal is IF filtered by an IF filter 266 that in one embodiment is a SAW device, and amplifier by an IF amplifier 267. The filtered and amplifier IF signal is downconverted to baseband by a mixer 269 that uses a signal from the local baseband oscillator 213. The baseband signal is amplified by amplifier 271 to produce in-phase (I) and quadrature (Q) signals. Each of the I,Q signals is low-pass filtered by LPFs 272 and 273, respectively, and amplified by amplifiers 274 and 275, respectively. The low-pass filtered and amplified baseband signals are sampled by analog to digital converters (ADCs) 276 and 277, respectively to produce a set of I and Q baseband signals for further processing by the receive processor 235.

Some embodiments include an RSSI circuit 296 that in one implementation includes an integrator to measure the integrated signal power in the I-channel. Other RSSI measuring circuits also may be used in alternate embodiments. Those embodiments that use the RSSI as a measure of the quality of reception, e.g., in order to select the spatial processing mode use the RSSI circuit to provide the measure of the quality of reception.

Not shown in FIG. 2D are those components that may be used in some forms of switched antenna diversity and of delay and add processing as described further below.

Figure 4:
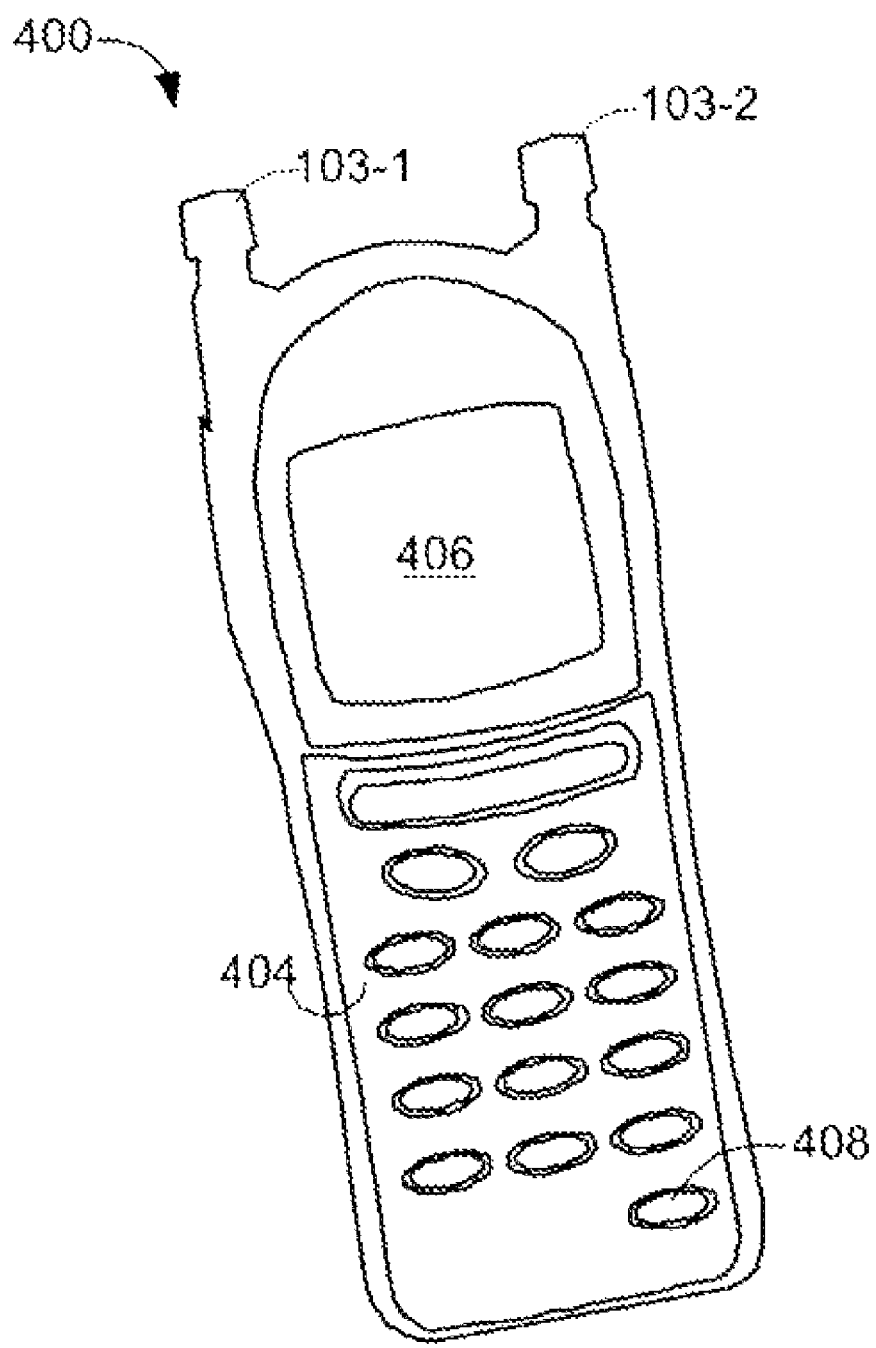
FIG. 4 shows a typical handset in which an embodiment of the invention may be used.

FIG. 4 shows one example of a handset 400 for a cellular wireless communication system in which the present invention may be incorporated. The handset includes an antenna array comprising two antennas 103-1 and 103-2, respectively. The handset further includes a keypad 404 and a display screen 406. One keypad embodiment includes a special key 408 that may be used to select the spatial processing mode used in the handset. Not shown in the handset are the internal components as described in FIGS. 2A-2D.

Different Spatial Processing Modes

Different forms of spatial processing are known. In some situations, one form of spatial processing may be preferable over another. For example, when the spatial processing is in a remote terminal, low power consumption is often desirable. In the case of the remote terminal receiving, if the signal quality is high enough, relatively simple receive spatial processing or even no spatial processing may provide for "good enough" communication while keeping the power consumption low. When the received signal quality is low, complicated spatial processing may be required to provide "good enough" communication. Remote terminal receiver embodiments of the present invention include a plurality of spatial processing modes, in order, for example, to keep the power consumption low.

By a spatial processing mode is meant the spatial processing method and the mode therefore. One aspect of the invention is providing for the receiver in a remote terminal unit two or more modes that are in a hierarchy of modes according to how much power and/or how much computational power the mode requires. Selecting a mode means selecting spatial processing method when there are spatial processing multiple methods provided, and/or selecting a mode for the selected method or, for the provided method if only one method is provided. Different embodiments of the remote terminal unit two or more modes that may include one or more of the methods summarized in Table 1 below.

TABLE 1

| Method | Comment |
| --- | --- |
| Switched antenna diversity | Can be implemented with only one receive path on. |
| Delay and add | Can provide spatial processing with little additional computational requirements in terminal units that include equalization for multipath. Some embodiments may be carried out with less than full power on all the receive paths. |
| Switched beam | Can be implemented with only one receive path on. One embodiment includes a beamforming network. |
| Adaptive smart antenna processing: (blind) maximum ratio combining | May not require as much computation as other Adaptive smart antenna processing methods. |
| Adaptive smart antenna processing: (blind) known signal property | |
| Adaptive smart antenna processing: eigenvalue decomposition | |
| Adaptive smart antenna processing: known training signal | |
| Adaptive smart antenna processing: other | |

The above methods are discussed in more detail below. In general, though not necessarily, the more computational power is devoted to determining the strategy, the better the performance that can be achieved. Some methods determine the strategy by receiving signals as a result of transmission of a known training signal, and using the knowledge of the transmitted signal. Other methods are blind in that no training signal is required. Some blind methods use one or more known properties of the signal that was transmitted, e.g., that the signal was modulated to have a constant modulus, or that the modulation scheme had some other properties. Another blind method called maximum ratio combining gives more weight to stronger signals. Yet another method builds a mathematical model using matrices and determines and decomposes the eigenvectors for some of the matrices. Other spatial processing methods also are known to those in the art and may be included in different receiver embodiments.

In addition to selecting a method, according to one embodiment of the invention, the selector selects different modes within the same method. One embodiment includes for one or more of the provided methods, different modes for a selected method differing by how often the strategy for the method is determined, i.e., how often the parameters of the selected method are adjusted. For example, if switched antenna diversity is one of the provided methods, different switched antenna diversity modes differ by how often the best antenna is selected. If one embodiment includes adaptive switched beam processing, different switched beam modes differ by how often the best beam is selected. As a further example, if one embodiment includes adaptive smart antenna spatial processing, different modes may differ by how often the adaptive strategy to use is determined.

One embodiment further includes for one or more of the provided methods, different modes for a selected method differing by what operating mode some or all of the receive paths work under for embodiments that include a switchable power supply that provide for at least one of the receive paths operating at more than one operating mode. For example, one embodiment provides for the receive paths to operate in a low-power mode or a normal power mode. One embodiment further includes for one or more of the provided methods, different modes for a selected method differing by how many receive paths are activated, e.g., by how many antennas are active for the method.

Switched Antenna Diversity

In some embodiments, the set of spatial processing modes includes at least one switched antenna diversity mode. Referring to FIG. 2C, some embodiments include network 202 for selecting the best antenna from the antennas 203-1, . . . , 203-M according to the quality of the signal received. Different embodiments use a different signal quality measure to determine which antenna to select, and such different embodiments include a circuit to determine the signal quality according to the signal quality measure. Such measures include but are not limited to received signal strength indications (e.g., RSSI), bit error rate (BER), frame error rate (FER), signal to noise ratio (SNR), and signal to interference and noise ration (SINR). The switchable power supply switched all receive paths but one to off for switched antenna diversity. Switched antenna diversity has the advantage of simplicity and low power consumption. Only one receive path is active, and the strategy determining, i.e., selecting the antenna to use, is computationally relatively simple. Different switched antenna diversity modes may differ by how often the best antenna is selected. Different switched antenna diversity modes may also differ by operating the one active receive path in a low-power and a normal power operating mode. Different switched antenna diversity modes may also differ by how many antennas are selected from for embodiments that include more than two antennas.

Delay and Add Processing

In some embodiments, the set of spatial processing modes includes at least one delay and add spatial processing mode.

Delay and add processing is advantageously used to provide spatial processing without extensive processing overhead. Delay and add processing takes advantage of multipath combining capabilities that may exist in the receive processor of conventional receivers. For example, a GSM handset commonly includes an equalizer for processing signals that are corrupted by multipath propagation. A CDMA handset also commonly includes a rake receiver that enables the handset to process received multipath signals and undo the effects of multipath. Such equalizers and processors typically deal well with a multipath signal that is modeled as two or more copies of the same signal delayed by different amounts. As used in embodiments of the invention, delay and add spatial processing forms a signal—called a "sum signal" herein—that is a sum of a signal received at one antenna with one or more delayed versions of respective signals received at one or more respective additional antennas. The sum signal is then processed by a circuit in the receive processor of the receiver designed for multipath signal processing, e.g., an equalizer or other multipath processor to extract a received signal from the sum signal. This provides some degree of spatial processing, and thus, for example, may improve fading immunity compared to receiving from one antenna. Delay and add processing does not require prior knowledge about the received signals, and is relatively simple to implement. Furthermore, unlike some spatial processing methods, delay and add processing does not require such information as spreading codes and synchronization information. Accordingly, in one embodiment, delay and add processing is selected when such information is unavailable, such as when the mode of operation of the remote terminal unit has not acquired such information, e.g., at initial acquisition, or handover for a cellular handset.

FIGS. 3A-3D describe different embodiments of delay and add processing. The receiver's baseband processor 215 provides multipath received signal processing. In each of the embodiments, a sum signal is formed by adding to the received signal from one antenna, e.g., antenna-1, one or more signals from one or more respective additional antennas, each signal delayed by a respective predetermined amount. The predetermined delays for the antenna signals are selected to be within the range of the multipath processing capabilities provided in the receiver. The embodiments differ mainly in where in any signal path a delay is introduced.

Figure 3A:
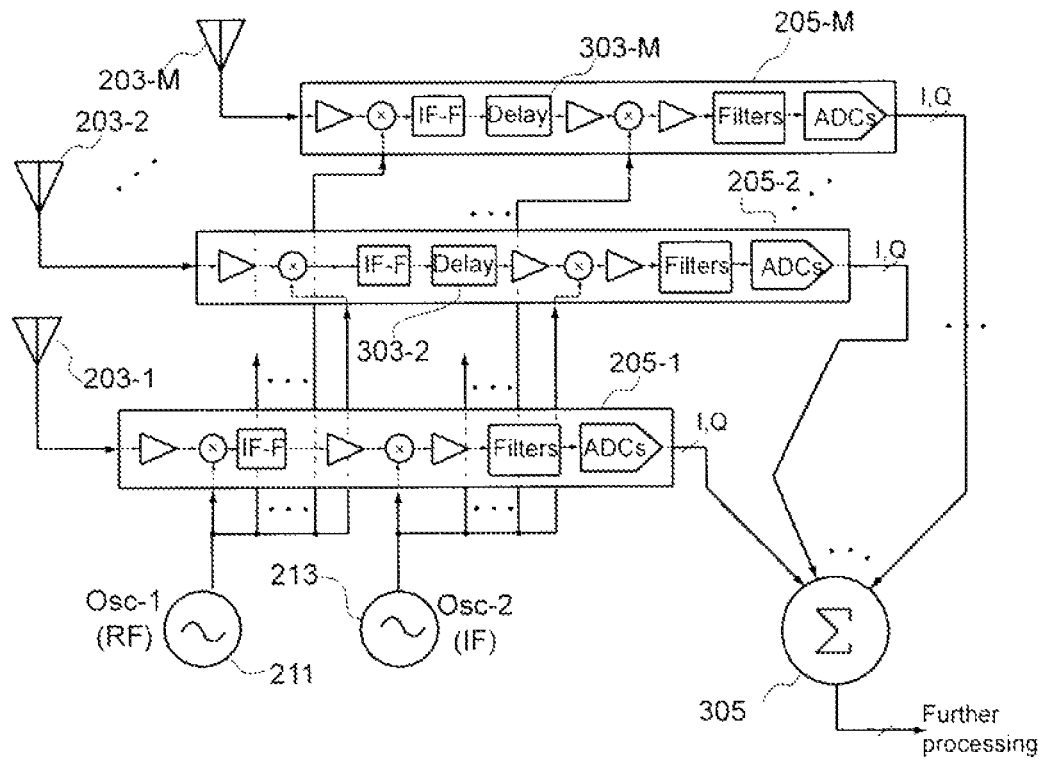
FIG. 3A shows one embodiment of terminal unit that includes delay and add spatial processing, with the delay in the IF signal path.

FIG. 3A shows one embodiment wherein the receive paths include conversion to IF and wherein the delays are introduced in IF. The embodiment of FIG. 3A includes one or more receive paths 205-2, . . . 205-M that each include a delay element shown as element 303-2, . . . , 303-M, respectively, in the IF path of receive paths 205-2, . . . 205-M, respectively. Such delay elements may be implemented, for example, as surface acoustic wave (SAW) devices. Each of the receive path includes an ADC to form digital received signals. The sum signal is formed by digitally adding the digital received signals by an adder 305 implemented, for example, in baseband processor 215.

Figure 3B:
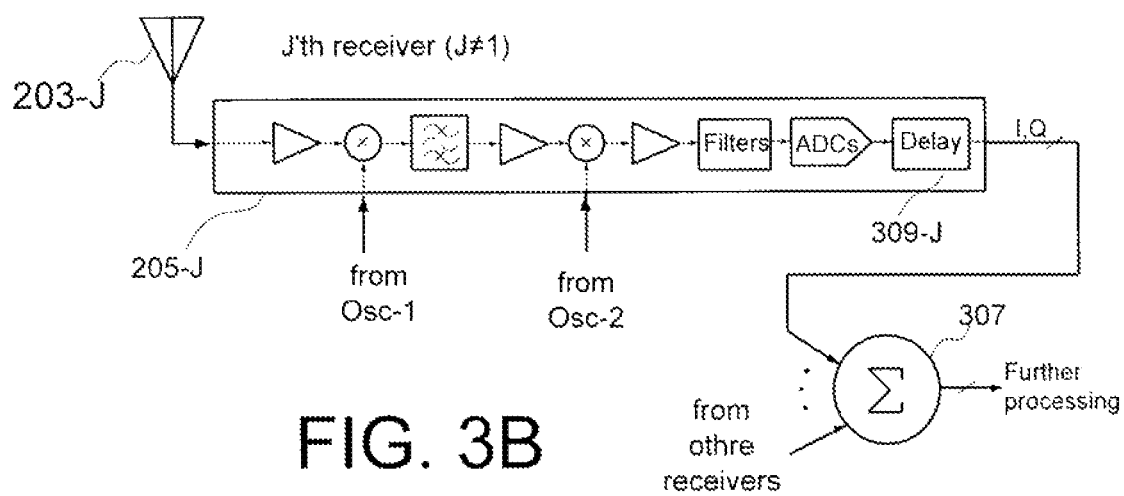
FIG. 3B shows an alternate embodiment of one of the receiver signal paths of a terminal unit that includes delay and add spatial processing, with the delay in the digital signal path.

FIG. 3B shows a simplified block diagram of a receive path in another embodiment that includes delay and add processing. The delay and add processing is introduced at baseband after conversion from analog to digital form. FIG. 3B shows one receive path, denoted 205-J in the J'th path, where J=2, . . . , M. Receive path 205-J includes a digital delay element 309-J that introduces a predetermined delay. One embodiment uses a circular buffer for the delay, another uses a FIFO, and yet another uses a digital delay line.

Figure 3C:
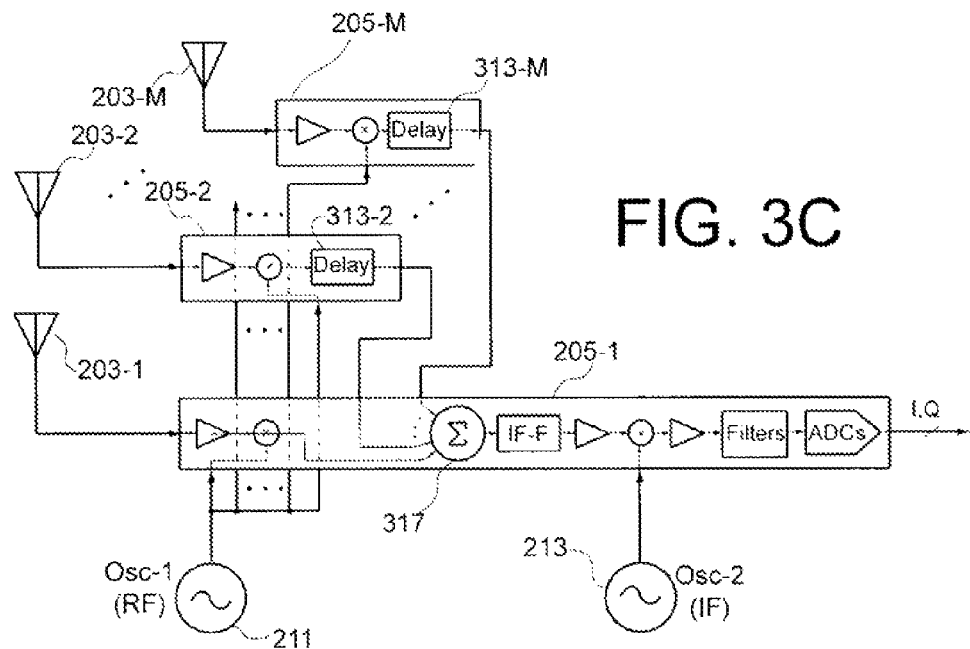
FIG. 3C shows another embodiment of terminal unit that includes delay and add spatial processing, with the delay in the IF signal path.

FIG. 3C describes another embodiment that, like the embodiment of FIG. 3A, introduces delays in the IF path of one or more signal paths. One receive path, e.g., 205-1 includes an analog adder 317 that adds the IF signal of the antenna associated with the receive path 205-1 with IF signal from one or more other receive paths. The addition is in the analog IF domain. In the embodiment shown, the adder output is input to the IF filter of the one receive path 205-1. The other receive paths, 205-2, . . . , 205-M are each switchable between a first mode as a complete receive path and a second low power delay and add mode wherein some of the elements, including some of the IF elements are switched off. Each of the receive paths 205-2, . . . , 205-M include the low-noise amplifier, the downconverter to IF, and a delay element in the IF path. The respective delay elements are shown as 313-2, . . . , 313-M in the receive paths 205-2, . . . , 205-M, respectively. The outputs of the delay elements are input to the adder 317. In the delay and add operating mode, only one receive path is fully on, thus saving power.

Figure 3D:
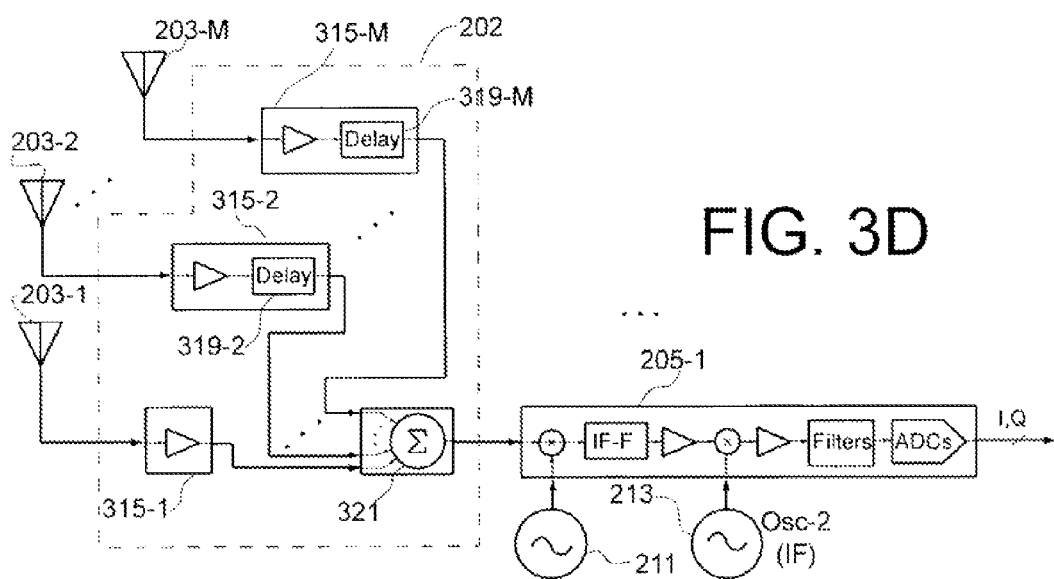
FIG. 3D shows an embodiment of terminal unit that includes delay and add spatial processing, with the delay in the RF signal path.

FIG. 3D describes another embodiment that introduces delays in the RF path of one or more signal paths. Referring to FIG. 2C, the delay and add processing is provided in a delay and add network 202 that provides a sum signal in RF. Each of the receive paths but one, e.g., each of paths 205-2, . . . , 205-M are each switchable on and off. For delay and add processing, the control signal activates the delay and add processing in network 202, and switches off all receive paths but one, e.g., receive path 205-1. In the embodiment shown in FIG. 3D, the network 202 includes a set of elements 315-1, . . . , 315-M for each of the M antenna signals with each element 315-1, . . . , 315-M including a low noise amplifier and each but that for receive path 205-1, i.e., each element 315-2, . . . , 315-M including a respective delay element 319-2, . . . , 319-M. The delay elements in one embodiment are SAW devices. The delay and add network 202 includes an analog summer 319 that accepts as input the outputs of each of elements 315-1, . . . , 315-M and generates the sum signal in RF. In the delay and add operating mode, only one receive path is fully on, thus saving power.

An alternate version of the embodiment of FIG. 2C, the low noise amplifiers are in each of the receive paths rather than in delay and add processor 202.

Different delay and add modes may differ by how many antennas are selected for embodiments that include more than two antennas. Different delay and add modes may also differ by how different operating modes for the receive paths that are active. Some embodiments also provide for changing the amount of delay each of the delay elements provide, and for such embodiments, different delay and add modes may also differ by the different amounts of predetermined delays.

Adaptive Switched Beam Processing

In some embodiments, the set of spatial processing modes includes at least one adaptive switched beam spatial processing mode. Referring to FIG. 2C, network 202 includes a beamforming network that forms a plurality of beams by forming a plurality of combinations of the signals from the antennas 203-1, . . . , 203-M and a set of switches for adaptively selecting one of the beams, e.g., one of the outputs of the beamforming network combinations according to a selection criterion. One embodiment uses a Butler matrix for the beamforming network. Each of the receive paths but one, e.g., each of paths 205-2, . . . , 205-M are each switchable one and off by one or more control signals. For adaptive switched processing, the control signals activate the adaptive switched beam processing in network 202, and switch off all receive paths but one, e.g., receive path 205-1.

Further details of how to construct the beamforming network 202 and operate it in an adaptive manner would be known to those in the art.

Different adaptive switched beam modes may differ by how often the best beam is selected. Different adaptive switched beam modes may also differ by operating the one active receive path in a low-power and a normal power operating mode. Different adaptive switched beam modes may also differ by how many antennas are selected from for embodiments that include more than two antennas.

Note that while present-day technology may be such that a suitable beamforming network, e.g., a Butler matrix of sufficiently small size and high performance is too expensive and large for inclusion in a mobile terminal unit, it may be that in the future such a beamforming network will be reasonably priced to be included in the network 202.

Adaptive Smart Antenna Processing

In some embodiments, the set of spatial processing modes includes at least one adaptive smart antenna processing method and one or more modes for the one or more adaptive methods. In general, adaptive smart antenna processing includes, in the case of receive spatial processing, forming a processing strategy (called a beamforming strategy) to preferentially receive a signal from a selected remote transmitter. In some embodiments, interference also is rejected from known co-channel interferers.

Many adaptive smart antenna processing methods are known, and only some are mentioned herein. Receive smart antenna processing may be linear or non-linear. One form of linear receive smart antenna processing includes adjusting the phase and amplitude of each of the received signals from receive paths 205-1, . . . , 205-M by phase and amplitude amount according to a receive processing strategy that is determined from time to time, and combining (adding) the weighted signals. Each antenna signal's phase shift and amplitude change may be described by a complex-valued weight so that determining the beamforming strategy includes determining a set of complex weights such that the sum of the weighted receive signals preferentially selects or enhances the signals received from a selected transmitter, and in some strategies preferentially rejecting or significantly reducing the contributions of signals from interfering transmitters.

Several methods are known for determining the receive weight set for receiving from a selected transmitter. Referring to FIG. 2C, the spatial processing strategy is determined by spatial processing unit 221 according to the particular method. The weighting and combining of the signals from each of the receive paths 205-1, . . . , 205-M according to the determined weight set also is carried out by spatial processing unit 221.

The adaptive smart antenna processing methods may differ in the level of computational complexity required for the processing, and in the amount of computational power required for the strategy determining. For example, one method provides linear phase processing only, with no amplitude weighting of the signals received or signal for transmission.

Different adaptive smart antenna processing modes may differ by how often the beamforming strategy is determined. Different adaptive smart antenna processing modes may also differ by the level of complexity allowed in the processing, e.g., linear phase processing only, with no amplitude weighting. Different adaptive smart antenna processing modes may also differ by the operating modes of the receive paths, e.g., in a low-power and in a normal power mode. Different adaptive smart antenna processing modes may also differ by how many antennas are selected for inclusion for embodiments that include more than two antennas.

Blind Adaptive Smart Antenna Processing: Maximum Ratio Combining

A blind spatial processing method is one that does not depend on any prior knowledge about the content of the signal transmitted. For example, the transmitted signal may or may not contain some known training signal. A blind method does not use knowledge of the training signal to determine the strategy, and thus would be equally applicable to receiving signals that contain and that do not contain a known training signal.

In some embodiments, the set of spatial processing modes includes at least one blind adaptive smart antenna processing mode. In particular, some embodiments provide adaptive smart antenna processing using maximum ratio combining. In maximum ratio combining each signal branch is multiplied by a weight factor that is varied according to, e.g., proportional to the signal amplitude. That is, branches with strong signal are further amplified, while weak signals are attenuated. The spatial processing unit 221 combines the signal from each of the antennas by weighting the signal with a factor that varies as the amplitude of the signal, e.g., according to a received signal strength (RSSI) indication and combining the weighted signals.

Blind Adaptive Smart Antenna Processing: Known Signal Property

One strategy determining method uses knowledge about the signals transmitted by the selected transmitter such as knowledge about the way in which data is modulated onto the signals. For example, if it is known that the modulated transmitted data uses a modulation scheme that has a constant modulus, a transmitted signal can be reconstructed from a plurality of signals received by an antenna array by adjusting the weights in a variable receive weight set so that the reconstructed transmitted signal is closest to a constant modulus signal according to some criterion, e.g., minimum squared deviation from a constant modulus signal. Examples of communication systems that use a constant modulus modulation scheme include phase modulation (PM), frequency modulation (FM), phase shift keying (PSK) and frequency shift keying (FSK). If, for example, it is also known that the modulated transmitted data uses a modulation scheme such as π/4DQPSK wherein subsequent symbols can only vary in phase by pre-known amounts, one strategy determining method determines the set of weights such that the reconstructed signal most closely resembles a signal having that property according to some criterion.

In some embodiments, the set of spatial processing modes includes at least one blind adaptive smart antenna processing method based on a known signal property. In such embodiments, the spatial processing unit 221 upon command from the controller 225 determines the strategy using a blind adaptive smart antenna processing method that uses one or more known properties of the signal.

Note that such methods are still classified as "blind" herein because while one or more properties of the signal that was transmitted is known, the data content of any part of the signal, e.g., any included training sequence, need not be known.

Adaptive Smart Antenna Processing: Known Training Signal

Some wireless communication systems specify signals for transmission that include a known part called a training signal herein. The training data may be used at a receiver for various purposes, e.g., for channel estimation and equalization. For example, in a GSM system the middle portion of each burst contains a known 26 bit training sequence. Similarly in a CDMA system, a known pilot signal is contained in the received signal. The known training data can also be used to determine an adaptive smart antenna strategy. In some embodiments of the present invention, the set of spatial processing modes includes at least one adaptive smart antenna processing mode that uses training data that is known to exist in transmitted signals. Such a strategy determining method determines for a part of the received signal that corresponds to the known training data the set of weights that generates a signal that most closely matches the known training data. In particular, the set of weights is generated such that the correlation of the weighted sum of the part of the received signal with a locally generated version of the training data is high.

Adaptive Smart Antenna Processing: Other Methods

Other adaptive smart antenna processing methods also are known. These may be linear or non-linear. Some include channel equalization so that rather than a set of weights, a set of filters is determined for each of the signals from the respective receive paths. Different embodiments of the invention can include other adaptive smart antenna processing methods, including methods that are developed in the future.

Selection of Processing Mode

Remote terminal unit 101 (or 111) includes a receive processor embodied in baseband processor 215 for processing received signals and a transmit processor for processing to-be-transmitted signals. Different embodiments of the remote terminal unit provide two or more modes of one or more of the methods summarized in Table 1 above. In one implementation, remote terminal unit 101 includes one or more of switched diversity processing, delay and add processing, and/or adaptive smart antenna processing. The selector 227 selects the spatial processing mode—including the spatial processing method—for processing the signals received by remote terminal unit 101. In one embodiment, the selector 227 is responsive to a select input 224. The selector 227 is coupled to the power controller 239 that enables or adjusts the receive paths according to the spatial processing method and mode selected.

Different embodiments include different types of selection control. Some remote terminal embodiments include manual control, e.g., in the form of a manual mode selector for a user to operate for manually controlling spatial processing. Some remote terminal embodiments include remote control from a remote device such as a base station in communication with the remote terminal. With remote control, the terminal unit receives a control message from the remote device for controlling the selection of spatial processing mode. Some remote terminal embodiments include automatic control of the mode wherein the selector automatically selects the spatial processing mode according to one or more selection criteria. Each of these is discussed in more detail below.

Manual Control

One embodiment of remote terminal unit 101 includes a user interface that includes a manual mode selector for a user to manually control spatial processing. In one implementation, the manual mode selector is a mechanical button 408 on the remote terminal unit keypad 404 (FIG. 4). In one embodiment, actuation of the button causes a selection from among spatial processing modes available in the remote terminal unit for the air interface being used. The available modes are displayed on the screen 406 and the user selects from the displayed spatial processing modes. In one embodiment, the modes are described to the user on the screen according to characteristics of the mode, e.g., "highest priority," "high speed data," "low power," "normal," and so forth. A mapping is included in the remote terminal from the characteristics to one or more spatial processing methods and one or more modes thereof. For example, as a result of the user selecting "highest priority," the selector 227 selects from the available processing modes the spatial processing mode that provides a high likelihood of successful communication, e.g., using adaptive smart antenna processing with all available receive paths active at full power. As another example, when a user selects "low power," the selector 227 selects the lowest power processing method, e.g., by switching off all receive paths but one.

In one embodiment, the button is a "Improve the reception" button that changes the mode in order to improve the quality of reception by applying a spatial processing method and mode that is known to provide better reception.

In another embodiment, each time the user activates the manual mode selector, e.g., the button 404, the selector selects a different mode from the one in effect. The user keeps activating the manual mode selector until the signal quality is of a sufficient quality. While in one embodiment, the selector selects the next highest power consuming mode every time the user activates the manual mode selector, in another embodiment, the selector selects the next mode at random from available modes.

In alternate embodiments, the manual mode selector for controlling spatial processing operations is provided by an on-screen button. In such an embodiment the display 404 is a touch screen. In another embodiment, a voice command activates the selection. In yet another embodiment, a mouse click, or other input device or a combination of input mechanisms is used.

Remote Control

In one embodiment, the terminal unit receives one or more control signals from a remote device such as a base station to select the spatial processing mode. The signals are recognized by the receive processor and form the select input 224 to the selector 227. Consider the case that the remote device is a base station. The base station causes the selector 227 in the remote terminal unit to select the spatial processing method and mode based on one or more criteria at the remote device. Such criteria include one or more of the quality of signals received at the base station from the remote terminal unit—e.g., as determined according to one or more of the RSSI, SNR, SINR, CIR, BER, and FER of signals from the terminal unit, communication system requirements, the state of operation of the wireless communication between the base station device and remote terminal, and protocol or operational considerations.

Automatic Selection of Processing Mode: Static Selection

With automatic selection, the selector 227 automatically selects according to one or more selection criteria. The selection of the spatial processing mode may be static according to the one or more criteria, or adaptive. With static selection, the selection is made and remains for the duration of the communication with the remote device unless there is a failure, in which case a new selection is made. In one implementation, the new selection is a next best selection among the available modes given the selection criteria. In the case that the remote terminal unit includes a circuit to measure the quality of reception, e.g., the RSSI, the BER, or the FER, one indication of failure is that the quality of reception falls below a predefined level. With adaptive selection, an initial selection is made and possibly modified as a result of an evaluation.

In general, criteria for selecting one spatial processing mode over another or over no spatial processing may be based on one or more factors. Such factors include but are not limited to the quality of signals received from a selected transmitter in a remote device, e.g., a base station, or transmitted to a selected receiver of the remote device, the signal power delivered to a selected receiver, the relative importance between a selected remote receiver, transmitter or transceiver, and one or more interfering receivers, transmitters or transceivers, the relative need for mitigation or nulling of the signals received from or transmitted to an interferer, the input signal-to-noise (SNR) ratio, the carrier-to-interference ratio (CIR), the bit error rate (BER) and the spatial correlation between a transmitting remote device an interfering remote device.

In one embodiment, the selection criterion or criteria include one or more protocol-based, performance-based, and operational-based selection criteria.

Protocol-based criteria include, but are not limited to, selections based on the type of wireless system the terminal device operates in. For some embodiments of the invention, the same electronics and/or processing unit may be used for different types of terminal units that can be used in different types of wireless systems. Furthermore, some embodiments are for use in a multi-system terminal unit that can be used in more than one type of wireless communication system. One or more of the components for such a multi-system terminal are programmable to change characteristics according to the system of operation. Some embodiments include selecting a set of spatial processing modes according to the wireless system. For example, in a multi-system terminal unit, the selector 227 selects from different sets of available spatial processing modes depending on the system in use.

Performance-based criteria include selections based on the quality of reception at the terminal unit as measured by a measure of signal quality. Such criteria include but are not limited to: signal to noise ratio (SNR), signal to interference and noise ration (SINR), received signal strength indication (e.g., RSSI), or the like, or combinations thereof, or other performance-based indicators based on metrics of probability of error including, but not limited to, bit error rate (BER) and frame error rate (FER). Another measure available as a result of some strategy determining processes in some adaptive spatial processing methods is the spatial correlation between a desired transmitting remote device, e.g., the base station, and an interfering remote device, e.g., another user terminal or a different base station. Thus, in one embodiment, the selector 227 has access to a measure of the quality, e.g., from an included circuit to measure the quality of reception and selects the spatial processing mode from the available modes according to the measure of quality.

Operational-based criteria include selections based on, but not limited to, a protocol state of operation for the remote terminal unit. There typically are several states in a wireless communication protocol, e.g., , search, registration, idle, handover, and active. It may be preferable to use one spatial processing mode over another in any particular state of a protocol. Some embodiments of the invention include the selector 227 selecting from different sets of spatial processing modes depending on the state of the protocol. For example, communication in some states may be required to be of higher quality. In such a state, in one embodiment the selector selects only from adaptive spatial processing modes and only from those that use signals from all antennas. In one implementation for use in a cellular handset, the operational criteria include which of the set of states that includes, but is not limited to: off, search, registration, idle, handover, and active, the handset is in. A subset of the available set of spatial processing modes is provided for each state. The selector selects the spatial processing mode from those of the subset corresponding to the state of operation. Note that some subsets may include the whole set of modes.

Referring to FIG. 2C, in one embodiment, the process of selection based on the one or more criteria uses one or more tables 229 that are stored in memory 241. In one implementation, a single table is used. Each entry of the table stores a pointer to a processing method in the set of stored methods 223 together with parameters for the method that define the spatial processing mode, i.e., each entry includes a reference to a spatial processing mode. The table is indexed by an index that is a function of the one or more criteria. For example, in one implementation, a processing option is selected based on the received signal strength of signals received at the remote terminal unit 101. A table in table set 229 is indexed by an index value that depends on the signal strength. In that implementation, a signal strength measurement, e.g., the RSSI, is converted to an index and the index value is used to index the signal strength table in table set 229. In another embodiment, plural tables are included, each entry of each table may includes either a pointer and parameters that together define a processing mode, or a pointer to another table. Each entry of each table is indexed by a function of one selection criterion. For example, in one implementation, one table in table set 229 includes selections for each operational state within a protocol. Making this selection points to a second table in table set 229. The second table is indexed by a function of the quality of reception. The contents of the second table point to a spatial processing mode. In this manner, a set of cross referenced tables can be considered a single multiple-entry look-up table 229 that determines a selection based on values associated with a number of selection criteria, e.g., criteria that are based on performance, protocol and/or operational considerations.

Automatic Selection of Processing Mode: Variable Selection

Figure 5A:
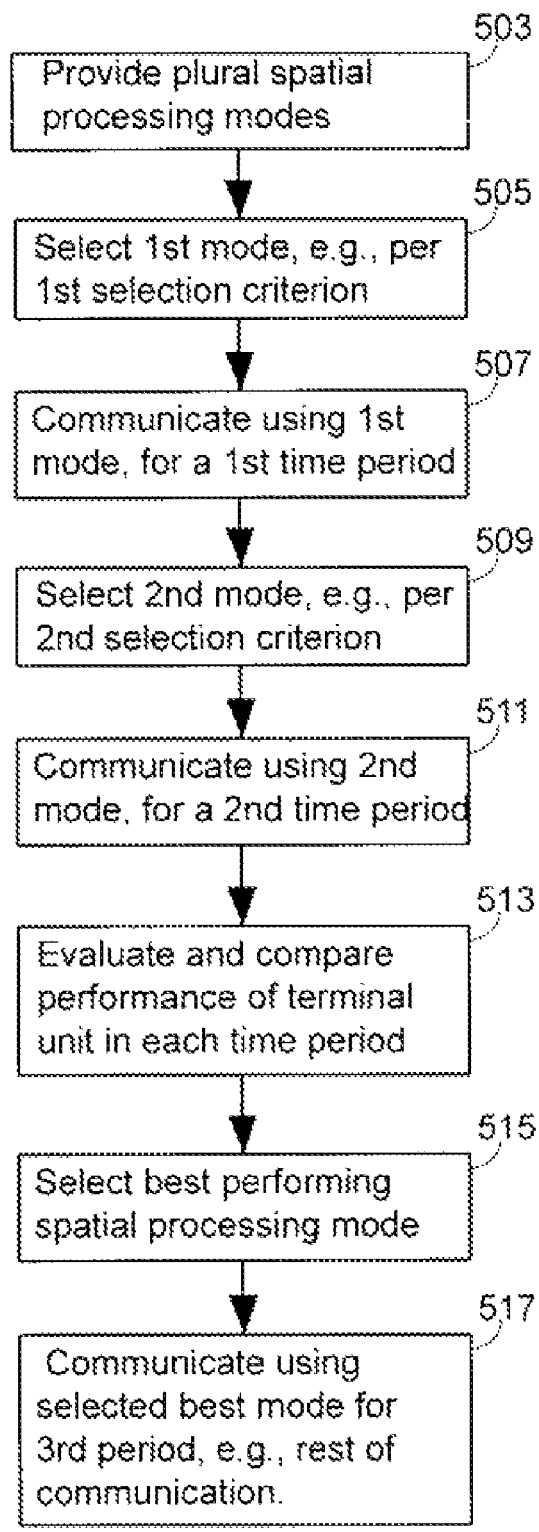
FIG. 5A shows a flowchart of an adaptive method of selecting the spatial processing mode.

In some embodiments, rather than selecting one mode according to the selection criterion that remains for the duration of the communication unless there is a failure, in an alternate embodiment, an adaptive (also called variable) selection process is used to select among available processing modes. One adaptive selection process includes selecting a first processing mode for a first period of time, and a second different processing mode for a second period of time, comparing the performance of the communication to the remote terminal in the first and second periods of time, and selecting the processing mode that gives the better performance for the remainder of the communication. FIG. 5A shows a flowchart of one adaptive selection embodiment. A set of spatial processing modes are provided, e.g., a first and a second spatial processing mode (step 503). An initial selection among the provided modes is made (step 505). In one implementation, the initial selection is based on one or more of signal performance, protocol, state of operation within the protocol, and type of system. In another embodiment, the initial selection is made randomly among the provided modes. In a step 507, the controller 225 including spatial processing unit 221 invokes the initial selection to process received signals and receives signals for a first time period. In one implementation, the first time period is a settable period measured in units of time or equivalently, a settable number of samples. This period is typically a pre-set parameter in the remote terminal. Alternatively, the first time period is measured in terms of signals or portions of signals processed, e.g., a number of frames or packets. In one implementation, the first time period corresponds to a time for processing at least a first portion of an error coding block. Step 507 may include determining if the first time period has expired, and if not, continuing processing signals using the initial selection until the first time period period has expired.

When the first period has expired, a new selection is made (step 509) from among the remaining spatial processing modes. Where only two spatial processing modes are available, the new selection includes the previously unselected mode. Otherwise, the selection may use a second selection criterion. Thereafter, the second selection is used to process received signals (step 511) until a second time period has expired. In one implementation, the second time period corresponds to a time for processing a second portion of a coding block. The performance of the remote terminal unit in each of the time periods is evaluated and compared (step 513). A final selection is made based on a measured performance level of the terminal device during each of the first and second time periods (step 513). The final selection includes a selection of a spatial processing mode from among the first and second selected modes that provides a better relative performance in the terminal device. In a step 515, the best performing spatial processing mode of the two previously selected modes is selected. The selected best spatial processing mode is used to process received signals in a third time period, e.g., for all signals received after the end of the second time period (step 517).

In one implementation, rather than selecting one spatial processing mode based on a single performance test as described above and in FIG. 5A, the selector uses an adaptive duty cycle selection process to compare different spatial processing modes with a primary spatial processing mode at different times. In one embodiment, a selection of a primary spatial processing mode is made and communication commences using the selected primary mode. After that, a second spatial processing mode is selected periodically and used for a time period that typically is relatively small compared to the time period when the primary selection is active. The performance of the second mode is compared to the primary mode and if better, the second mode is made the primary mode. The relative length of time of the primary and second modes is called the duty cycle. In one embodiment, the duty cycle is pre-defined. In an alternative implementation, the duty cycle adjusted according to the relative performance of the reception at the remote terminal unit.

In one embodiment, the amount of time used to process signals by the second spatial processing mode is approximately 5 percent of the total time for the primary and second modes, i.e., the duty cycle is 95/5. In another embodiment, a set of duty cycles is provided, and the duty cycle is selected from the set. The set of duty cycles, for example, includes 95/5, 90/10, 50/50, 60/40, and so forth, where the two numbers are the relative percentages of the total time spent on the primary spatial processing mode and the second spatial processing mode. The selection of the duty cycle in one embodiment is made automatically according to one or more selection criteria, that in one embodiment are the same criteria used to make the initial selection of the primary spatial processing mode. In one embodiment, the duty cycle is selected according to the type of error correcting coding used in the received signals such that communication continues even if one or more errors occur in the second time period. In one embodiment, the initial duty cycle selection is made remotely by the communicating entity, e.g., the base station. In yet another embodiment, the initial selection is made manually by the user in the same manner as a user selects a spatial processing mode (see above). In a particular implementation, the user manually selects the initial primary mode and the initial duty cycle.

Once communication commences, in one embodiment, the duty cycle remains fixed, i.e., the selected primary mode is used until a first time period passes and the second mode is tested for a second time period with the ratio of time periods fixed. In another embodiment, the duty cycle is adaptively updated after every pre-defined period of time, which might be a burst in a communication system that communicates burst-by-burst. The duty cycle is modified according to the received signal quality. For example, suppose communication is such that a 50/50 duty cycle is used. Prior to the end of the first time period, e.g., at the end of a burst, the quality of the received signal, e.g., the RSSI at antenna 1 is determined to be above a threshold cycle, the system changes to a 60/40 cycle. Upon subsequent bursts, the ratio is adjusted accordingly. In another implementation, the duty cycle selection is synchronized with the interleaving/coding structure to reduce the impact of a "bad" burst.

In an alternate embodiment, more than two spatial processing modes are selected for testing after the selected primary mode has been in operation for a first period of time. In such a case, in the case that several duty cycles are provided, the set of possible duty cycles includes duty cycles of more than two relative times, e.g., 90/5/5, 85,10,5, 80/10/10, and so forth for testing two new modes after the primary time period expires.

In one embodiment, feedback from the communicating device, e.g., the base station may be used to regulate the duty cycle. Such a feedback mechanism may already be present for other purposes. For example, a power control signal from a base station can be used as an indication of the quality of communication. In one version, a power control signal received from a base station in communication with the remote terminal is used as the feedback for deciding on duty cycle changes. Using such an existing signal requires no new electronics at the base station.

Figure 5B:
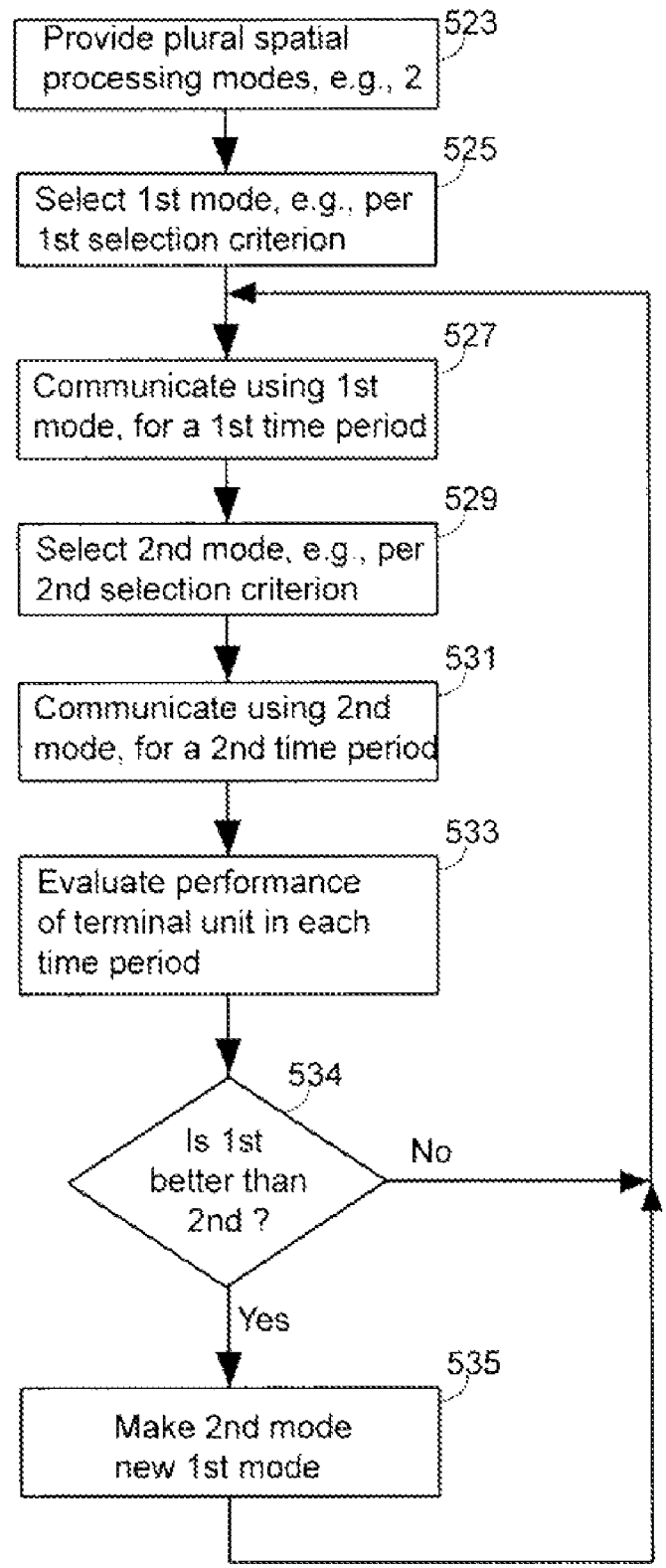
FIG. 5B shows a flowchart of another embodiment of an adaptive method of selecting the spatial processing mode.

A method for selecting a spatial processing mode using a variable duty cycle is shown in FIG. 5B. A set of spatial processing modes are provided, e.g., a first and a second spatial processing mode (step 523). An initial selection among the provided modes is made (step 525) to select a primary spatial processing mode. In one implementation, the initial selection is based on one or more of signal performance, protocol, state of operation within the protocol, and type of system. In another embodiment, the initial selection is made randomly among the provided modes. In a step 527, the controller 225 including spatial processing unit 221 invokes the selected primary processing mode and receives signals for a first time period. In one implementation, the first time period is a settable period measured in units of time or equivalently, a settable number of samples. Alternatively, the first time period is measured in terms of signals or portions of signals processed, e.g., a number of frames or packets. In one implementation, the first time period corresponds to a time for processing at least a first portion of an error coding block. Step 527 may include determining if the first time period has expired continuing processing signals using the initial selection until the period has expired.

When the first period has expired, a new selection is made (step 509) from among the remaining spatial processing modes of a second spatial processing mode set. The selection may use a second selection criterion. The second selection is used to process received signals (step 531) until a second time period has expired. The first and second time periods are according to a duty cycle. In one implementation, the second time period corresponds to a time for processing a second portion of a coding block. The performance of the remote terminal unit in each of the time periods is evaluated and compared (step 533). In step 535, if the performance of the second processing mode is superior to that of the primary mode, the second spatial processing mode becomes the first spatial processing mode and the process continues with step 517.

In an alternate embodiment of step 535, the same primary processing mode is maintained, but the duty cycle is modified to a new duty cycle from a set of available duty cycles. The process continues alternating among the primary processing mode and a newly selected second spatial processing mode with a duty cycle that varies as according to the adjustments made to the time periods associated with the respective spatial processing modes.

In one embodiment, the set of available duty cycles is determined by the type of wireless system in which the remote terminal operates, and the error coding used. Different systems use different amounts of error correcting coding in communication. The more error coding, the more errors can be tolerated without losing communication, e.g., without losing intelligibility of speech in a voice system. In one embodiment, the first and second time periods are according to a duty cycle and respectively correspond to a first and a second portion of a coding block. The range of duty cycles depends on the type of error coding such that communication is unlikely to be lost even if communication fails during one of the time periods. In one embodiment, by unlikely is meant 100% certainty. For example, it may be that the terminal unit operates in a communication system uses coding that permits 10% error rate per coding block but not more. In such a case, in order to be 100% certain that no communication would be lost, the set of available duty cycles may include 95/5 and 90/10, but not 85/15. That means that if all the errors occurred in the second time period, there would still be communication. The same terminal unit when operating in a wireless a communication system that uses more coding that can tolerate 15% error rate per coding block and that provides a 100% guarantee of no loss of communication uses a set of available duty cycles that includes 95/5, 90/10, and 85/15, but not 80/20. In another embodiment, by communication being unlikely to be lost assumes that the second time period may have as much as 50% bit error rate. This would allow an 80/20 duty cycle with a code that tolerated up to 10% bit error rate.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should be appreciated that the present invention is not limited to any particular communication system, device(s), or architectures, but rather, the invention may find use in various types of communication systems where a fixed or mobile remoter terminal unit may employ and benefit from spatial processing using multiple antennas. The terms "remote terminal" or "remote terminal unit" are used interchangeably herein and broadly to refer to various devices that may be employed, for example, in point-to-multipoint or peer-to-peer devices, including, but not limited to, cellular handsets, microwave point-to-multipoint subscriber units, WLAN modems, PCMCIA modems, etc., to provide wireless voice and/or data communications. Similarly, the terms "communication station" or "base station" as used in this description broadly refer to various types of devices or systems that serve or route data for a number of terminal units, including, but not limited to, cellular base stations, WLAN access points, microwave point-to-multipoint stations, etc. A "terminal" or "terminal unit" is used broadly herein to mean any fixed or portable communication device that may receive and/or transmit communication voice and/or data signals (e.g., a remote terminal, a base station, other communication device, etc.).

It should also be appreciated that the invention is not limited to a particular type of signal transmission, and may be employed in a variety of wireless or wired systems that might otherwise suffer from spectral inefficiency due to the use of guard bands. The invention may be employed in systems where there is exchange of voice, data, or voice and data signals. Furthermore, the invention may be employed in various communications architectures and air (or wired) interfaces, including, but not limited to, TDMA, CDMA, FDMA, W-CDMA, 802.11, 802.16, and/or other signal interface standards for voice and/or data transmission.

Thus, while the present invention has been described in terms of specific embodiments, the invention is not limited to these specific embodiments. Rather, the scope of the invention is defined by the following claims and other embodiments are within the scope of the claims.

For example, the terminal units described herein uses superheterodyne receivers with two downconversion stages converting to an IF frequency and the baseband, respectively. The invention does not depend on any particular type of receiver, and is also applicable to other architectures. One embodiment uses a single downconversion stage followed by an IF stage and analog-to-digital conversion at the IF frequency. Any further downconversion occurs in the digital domain. Furthermore, one terminal architecture uses the same local oscillators for the transmit electronics unit 207 and the receive electronic unit 205. One alternate embodiment has separate local oscillators for the transmit electronics unit 207.

Furthermore, the present invention has been described in terms of a terminal unit for use in a cellular wireless communication system with handsets and one or more base stations and in terms of a wireless data network. Those of ordinary skill in the art will readily recognize the application of these principles to terminal units for use in other communication systems.

Note that one embodiment is a TDMA embodiment using TDD, the invention is not restricted to such systems. The invention is also applicable to systems that use FDD. Different embodiments of the invention may be readily modified to accommodate multiple time slots, as in a TDMA system, including a GSM system; multiple codes, as in a CDMA system, including the IS-95, or some combination of these well known multiple access techniques. Furthermore, one or more of the spatial processing modes provided may also provide the capability of spatial division multiple access (SDMA) that can accommodate more than one simultaneous communication in the same conventional frequency channel, time slot channel, code channel, or combination thereof.

The remote communicating device, e.g., the base station may include multiple antennas and spatial processing, or may only have a single antenna. Furthermore, that remote communicating device may include adaptive smart antennas, but is not required to. Furthermore, that remote communicating device may provide SDMA but is not required to.

While the invention has been described with a handset in mind, an inventive remote terminal unit that includes an embodiment of one or more aspects of the invention may be a handset, a telephone unit, a computer, or a network appliance such as a Personal Digital Assistant (PDA), or some other remote device that includes a radio transceiver. Furthermore, a remote terminal may be mobile or fixed. Furthermore, a remote terminal may be for voice communication, for data communication, or for both. It is desired to add spatial receive processing to such a remote terminal.

Furthermore, the invention is not restricted for use in a remote terminal unit, and may be in for any other wireless receiver.

The invention is not restricted to any particular type of diversity that exists for two or more antennas of the antenna array. Diversity can be provided by one or more of: using physical separated antennas, using antennas of different shapes, using directional antennas that point to different directions, and antenna that provide polarization diversity. One or more other forms of diversity also may be used.

While the above description of a terminal unit includes a baseband processor 215 that in turn includes a receive processor, memory, control unit, and transmit processor, and that is implemented using one or more microcontrollers and one or more DSP devices, any other mechanisms for achieving the uplink and downlink smart antenna processing and control may be used. For example, in other embodiments, the functions may be implemented by custom logic, or as a combination of one or more processors and some custom logic. The unit may be implemented in a single ASIC device or custom VLSI device or combination of special made IC devices and standard devices.

Different embodiments include a circuit to determine the signal quality according to different signal quality measures. In some embodiments, the circuit is an analog circuit that provides the quality measure, e.g., an RSSI value, while in other, the circuit digitally determines the measure of quality, e.g., as part of determining the spatial processing strategy. The circuit to measure the quality of reception is in different embodiments an analog circuit, a digital circuit, a circuit implemented using one or more microcontrollers, or one or more DSP devices, such as the processor in the baseband processor. In other embodiments, the circuit to measure the quality of reception may be implemented by custom logic, or as a combination of one or more processors and some custom logic.

Other variations will become evident from the descriptions provided without departing from the spirit and scope of the invention which should only be limited as set forth in the claims that follow.

What is claimed is:

1. A radio receiver comprising:
    a receive processing unit coupled to process signals received from an antenna array by applying a selected spatial processing mode of a plurality of spatial processing modes of one or more spatial processing methods; and
    a selector coupled to the receive processing unit to select the spatial processing mode from the plurality of spatial processing modes, including selecting the spatial processing method in the case that the plurality of spatial processing modes are of more than one spatial processing method.

2. The radio receiver of claim 1, wherein the plurality of spatial processing modes includes at least one of:
    a group of one or more modes of a delay and add processing method;
    a group of one or more modes of a switched antenna diversity spatial processing method;
    a group of one or more modes of an adaptive smart antenna spatial processing method using a maximum ratio combining strategy determining method;
    a group of one or more modes of an adaptive smart antenna spatial processing method using a known signal property strategy determining method;
    a group of one or more modes of an adaptive smart antenna spatial processing method using a known training signal strategy determining method; and
    a group of one or more modes of a switched beam smart antenna spatial processing method.

3. The radio receiver of claim 2, wherein at least one of the groups includes different modes of a spatial processing method that has an associated frequency of determining the spatial processing strategy, and wherein the spatial processing modes in the group have different associated frequencies of determining the strategy, such that selecting from amongst the different modes in the group provides modes that consume different amounts of overall computational power.

4. The radio receiver of claim 2, wherein the processing unit includes a plurality of receive paths, each receive path to couple to a respective antenna of the antenna array to accept the signal from the respective antenna, at least some of the receive paths switchable between a first operating mode and a second operating mode according to a power control signal, the first operating mode consuming more power than the second operating mode, the receiver further including:
    a switchable power supply responsive to the power control signal and coupled to the receive paths to provide power to each receive path in the processing unit according to the power control signal,
    wherein the power control signal depends on the operating mode such that some of the spatial processing modes differ in the amount of power consumption by having the receive paths operate at different operating modes.

5. The radio receiver of claim 2, wherein the plurality of spatial processing modes includes a group of one or more modes of a delay and add processing method,
    wherein the antenna array includes a first antenna and one or more additional antennas,
    wherein when the selector selects the delay and add method, the receive processing unit is further to delay and add process the signals received at the first antenna and at least one of the additional antennas, the delay and add processing forming a sum signal being the sum of the signal received at the first antenna and delayed versions of respective signals received at the one or more additional antennas, and
    wherein the receive processing unit further includes a processor accepting the sum signal when the selector selects the delay and adding method, the processor having multipath combining capabilities.

6. The radio receiver of claim 2, wherein the plurality of spatial processing modes includes a plurality of modes of an adaptive smart antenna spatial processing method that periodically determines a smart antenna processing strategy, and wherein at least some of the different adaptive smart antenna modes differ by how often the smart antenna processing strategy is determined.

7. The radio receiver of claim 2, further comprising a memory to store instructions for spatial processing according to one or more of the spatial processing methods.

8. The radio receiver of claim 2, further comprising:
a user interface including a manual mode selector to manually select the spatial processing mode or no spatial processing.

9. The radio receiver of claim 2, wherein the selector automatically selects the spatial processing mode according to one or more selection criteria.

10. A radio receiver comprising:
a receive processing unit to process signals received at a plurality of antennas including a first antenna and one or more additional antennas, the receive processing unit including
a delay and add processing unit to process the signals received at the first antenna and at one or more of the additional antennas, the delay and add processing unit to form a sum signal being the sum of the signal received at the first antenna and delayed versions of respective signals received at the one or more additional antennas, the receive processor further including
a processor accepting the sum signal, the processor having multipath combining capabilities and forming a received signal, the receive processing unit further including
a receive electronics unit, the receive processing unit to apply a selected spatial processing mode to the signals, the selected spatial processing mode being of a plurality of spatial processing modes, including one or more modes of one or more spatial processing methods.

11. The radio receiver of claim 10, wherein the receive electronics unit includes:
a plurality of receive paths, each receive path to couple to a respective antenna of the plurality of antennas to accept the signal from the respective antenna, each including a downconverter to convert a radio frequency signal from its respective antenna to an intermediate frequency signal, the receive paths accepting signals from the one or more additional antennas including a delay unit after the downconverter to delay each signal by a respective predetermined amount,
an adder with inputs coupled to the outputs of the first receive path and the receive paths accepting signals from the one or more additional antennas, the adder to form the sum signal.

12. The radio receiver of claim 10, wherein the receive electronics unit includes:
a plurality of receive paths, each receive path to couple to a respective antenna of the plurality of antennas to accept the signal from the respective antenna, each receive path including an analog to digital converter to form a digitized signal from the respective antenna,
one or more respective digital delay element having an input coupled to the digital output of each of the receive paths accepting signals from the one or more additional antennas, digital delay elements introducing a respective predetermined delay to each digitized signal from the one or additional antennas, each digital delay element having an output, and
a digital adder having a set of inputs coupled to the outputs of each digital delay element and of the receive path of the first antenna, the adder to form the sum signal from the outputs of the receive paths.

13. The radio receiver of claim 10, wherein the receive electronics unit includes:
a plurality of receive paths, each receive path to couple to a respective antenna of the plurality of antennas to accept the signal from the respective antenna, each including a downconverter to convert a radio frequency signal from its respective antenna to an intermediate frequency signal, the receive paths accepting signals from the one or more additional antennas including a delay unit after the downconverter to delay each signal by a respective predetermined amount, the first receive path including an analog adder having a set of inputs, one input coupled to the output of the downconverter of the first receive path and to the outputs of the respective delay units, the adder forming the sum signal, such that the first receive path further processes the sum signal, and the receive paths other than the first need less power to operate than the first receive path.

14. The radio receiver of claim 10, wherein the receive electronics unit includes:
a delay and add processor including:
one or more radio frequency delay elements having an input coupled to the one or more additional antennas, and
an analog adder with inputs coupled to the outputs of the first antenna and of the delay elements, the adder to form the sum signal;
a receive path having an input coupled to the output of the adder to accept the sum signal, the receive path including a downconverter to convert the radio frequency sum signal to an intermediate frequency signal, and an analog to digital converter to form a digitized sum signal for further processing by the processor.

15. A radio receiver comprising:
a receive processing unit to couple to a plurality of antennas to apply a selected spatial processing mode to the signals received at the plurality of antennas, the selected spatial processing mode being of a plurality of spatial processing modes, including one or more modes of one or more spatial processing methods.

16. A radio receiver comprising:
means for providing a plurality of spatial processing modes, including one or more modes of one or more spatial processing methods;
means for selecting a spatial processing mode from the provided plurality; and
means for processing the signals received at a plurality of antennas by the selected spatial processing mode.

17. The radio receiver of claim 16,
wherein the means for selecting selects the spatial processing method in the case that more than one spatial processing method is provided, and
wherein the means for processing the received signals applies a spatial processing method and a spatial processing mode thereof selected from the plurality of modes.

18. The radio receiver of claim 17, wherein the plurality of spatial processing modes includes at least one of:
a group of one or more modes of a delay and add processing method;
a group of one or more modes of a switched antenna diversity spatial processing method;

a group of one or more modes of an adaptive smart antenna spatial processing method using a maximum ratio combining strategy determining method;

a group of one or more modes of an adaptive smart antenna spatial processing method using a known signal property strategy determining method;

a group of one or more modes of an adaptive smart antenna spatial processing method using a known training signal strategy determining method; and a group of one or more modes of a switched beam smart antenna spatial processing method.

* * * * *